United States Patent
Makeev et al.

(10) Patent No.: US 12,499,602 B2
(45) Date of Patent: Dec. 16, 2025

(54) INFERRED SKELETAL STRUCTURE FOR PRACTICAL 3D ASSETS

(71) Applicant: Roblox Corporation, San Mateo, CA (US)

(72) Inventors: Sergei Makeev, Foster City, CA (US); Adrian Paul Longland, Redwood City, CA (US); Jovanni Antonio Cutigni, San Mateo, CA (US); Satheesh Subramanian, San Ramon, CA (US); David B. Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 17/965,247

(22) Filed: Oct. 13, 2022

(65) Prior Publication Data

US 2023/0120883 A1   Apr. 20, 2023

Related U.S. Application Data

(60) Provisional application No. 63/404,871, filed on Sep. 8, 2022, provisional application No. 63/255,489, filed on Oct. 14, 2021.

(51) Int. Cl.
*G06T 13/40*   (2011.01)
*G06N 5/022*   (2023.01)
*G06T 17/00*   (2006.01)

(52) U.S. Cl.
CPC .......... *G06T 13/40* (2013.01); *G06N 5/022* (2013.01); *G06T 17/00* (2013.01)

(58) Field of Classification Search
None
See application file for complete search history.

(56) References Cited

U.S. PATENT DOCUMENTS

| 11,321,916 | B1 | 5/2022 | Zhang et al. |
| 2007/0273711 | A1 | 11/2007 | Maffei |
| 2010/0321386 | A1 | 12/2010 | Lin et al. |
| 2012/0075340 | A1 | 3/2012 | DeRose |
| 2013/0034276 | A1 | 2/2013 | Hibbard |

(Continued)

FOREIGN PATENT DOCUMENTS

KR   10-2019-0118213   10/2019

OTHER PUBLICATIONS

"APB: Creating a Powerful Customisation System for a Persistent Online Action Game", Retrieved from Internet: https://macropolygon.files.wordpress.com/2010/08/apb_customisation_gdc2010.pptx, 2010, 49 pages.

(Continued)

*Primary Examiner* — Alicia M Harrington
*Assistant Examiner* — Jed-Justin Imperial
(74) *Attorney, Agent, or Firm* — IP Spring

(57) ABSTRACT

Some implementations relate to methods, systems, and computer-readable media for inferring a skeletal structure to create a practical 3D asset. A user may create an avatar using different parts from different parent models. Upon creation, a data model for the avatar is examined to determine joint placement and infer an overall skeletal structure. Thereafter, different skinning techniques may be used to deform the avatar skin during animations based on the joint placement and movement.

20 Claims, 9 Drawing Sheets

(56) References Cited

U.S. PATENT DOCUMENTS

| | | |
|---|---|---|
| 2013/0057544 A1 | 3/2013 | Oh |
| 2014/0267268 A1 | 9/2014 | Tipton |
| 2015/0029198 A1 | 1/2015 | Sumner et al. |
| 2016/0163103 A1 | 6/2016 | DeTemmerman |
| 2016/0171296 A1 | 6/2016 | Ikenoue |
| 2016/0284018 A1 | 9/2016 | Adeyoola et al. |
| 2016/0379419 A1 | 12/2016 | Khalili et al. |
| 2017/0032579 A1 | 2/2017 | Eisemann et al. |
| 2017/0161948 A1 | 6/2017 | Hua et al. |
| 2017/0352092 A1 | 12/2017 | Mitchell et al. |
| 2018/0315254 A1 | 11/2018 | Grant et al. |
| 2019/0035149 A1* | 1/2019 | Chen ................... G06V 40/166 |
| 2019/0088033 A1 | 3/2019 | Kuchibotla et al. |
| 2019/0362529 A1 | 11/2019 | Wedig et al. |
| 2019/0371080 A1 | 12/2019 | Sminchisescu et al. |
| 2020/0035010 A1 | 1/2020 | Kim et al. |
| 2021/0082179 A1 | 3/2021 | Fedyukov et al. |
| 2021/0150806 A1* | 5/2021 | Guler ..................... G06T 13/40 |
| 2021/0224765 A1 | 7/2021 | Siddique et al. |
| 2022/0035443 A1* | 2/2022 | Winold ................. G16H 40/63 |
| 2022/0292791 A1 | 9/2022 | Makeev et al. |

OTHER PUBLICATIONS

"RBF Character Conversion", Retrieved from Internet: http://www.polygon.me/2018/08/rbf-character-conversion.html, Aug. 9, 2018, 3 pages.
Agafonkin, "Edgebreaker, the heart of Google Draco", Retrieved from Internet: https://observablehq.com/@mourner/edgebreaker-the-heart-of-google-draco, Oct. 16, 2019, 9 pages.
Anjyo, et al., "Scattered Data Interpolation for Computer Games", SIGGRAPH 2014 Course Notes, 2014, 69 pages.
Appleby, et al., "Punching Above Your Weight: Small Art Teams, Big Games", Video; retrieved from Internet: https://www.gdcvault.com/play/1014359/Punching-Above-Your-Weight-Small, 2011, 4 pages.
Bailey, et al., "Fast and deep deformation approximations", ACM Transactions on Graphics, vol. 37, Issue 4, Aug. 2018, 12 pages.
Barak, "Adaptive Clothing System in Kingdom Come: Deliverance", Retrieved from Internet: https://www.gdcvault.com/play/1022822/Adaptive-Clothing-System-in-Kingdom; see also video at: https://www.gdcvault.com/play/1022771/Adaptive-Clothing-System-in-Kingdom, 2015, 39 pages.
Botsch, et al., "Real-Time Shape Editing using Radial Basis Functions", Eurographics 2005, vol. 24, No. 3, 2005, 11 pages.
De Goes, et al., "Mesh Wrap based on Affine-Invariant Coordinates", ACM SIGGRAPH 2019 Talks, 2019, 2 pages.
Desbrun, et al., "Implicit Fairing of Irregular Meshes using Diffusion and Curvature Flow", SIGGRAPH '99: Proceedings of the 26th Annual Conference on Computer Graphics and Interactive Techniques, Jul. 1999, 8 pages.
Feng, et al., "Avatar Reshaping and Automatic Rigging Using a Deformable Model", Proceedings of the 8th ACM SIGGRAPH Conference on Motion in Games, 2015, 8 pages.
Fortier, "Universal Character System in Saints Row 2", Video; retrieved from Internet: https://www.gdcvault.com/play/1289/Universal-Character-System-in-SAINTS, 2009, 3 pages.
Gagliardi, et al., "A Two-Step Mesh Adaption Tool Based on RBF with application to Turbomachinery Optimization Loops", Evolutionary and Deterministic Methods for Design Optimization and Control With Applications to Industrial and Societal Problems. Springer, Cham, 2019, pp. 127-141.
Godard, "Plugin and Nodal Demo Reel 2016", Video; retrieved from Internet: https://vimeo.com/166291982#t=3m33s, 2016, 3 pages.
Kim, et al., "GeoFilter: Geometric Selection of Mesh Filter Parameters", Eurographics, Computer Graphics Forum, available at https://faculty.cc.gatech.edu/~jarek/papers/GeoFilter.pdf, Jan. 31, 2005, 8 pages.
Lalleve, et al., "Character Pipeline and Customization System for 'Far Cry Primal'", Retrieved from Internet: https://www.gdcvault.com/play/1024578/Character-Pipeline-and-Customization-System, 2017, 104 pages.
Li, et al., "Fitting 3D garment models onto individual human models", Computers and Graphics 34, 2010, pp. 742-755.
Nair, "Innovations in the Sims 4 Character Creator", Retrieved from Internet: https://www.gdcvault.com/play/1022086/Innovations-in-The-Sims-4, 2015, 89 pages.
Niu, et al., "Radial basis function mesh deformation based on dynamic control points", Aerospace Science and Technology 64; retrieved from Internet: https://dacemirror.sci-hub.tw/journal-article/b485b3a622b0953d5a8c898a5a6cc563/niu2017.pdf (Abstract), 2017, pp. 122-132.
Rossignac, "Edgebreaker: Connectivity compression for triangle meshes", GVU Technical Report GIT-GVU-98-35, IEEE Transactions on Visualization and Computer Graphics, Jan.-Mar. 1999, 15 pages.
Schiffmann, "RBF Interpolation for Mesh Deformation", Retrieved from Internet: https://imsc.uni-graz.at/haasegu/Lectures/GPU_CUDA/WS16/2016-11-03-HPC1-Schiffmann-RBF.pdf, 2016, 12 pages.
Selim MM, et al., "Mesh Deformation Approaches—A Survey", J. Phys. Math., vol. 7, Issue 2, 2016, 9 pages.
Shepherd, "Building Customizable Characters for Bungie's Destiny", Video; retrieved from Internet: https://www.gdcvault.com/play/1020412/Building-Customizable-Characters-for-Bungie, 2014, 4 pages.
Stokan, "Ultimate Customization in Character Creation—Challenges and Innovations", Video; retrieved from Internet: https://www.gdcvault.com/play/1014370/Ultimate-Customization-in-Character-Creation, 2011, 4 pages.
Taubin, "A Signal Processing Approach to Fair Surface Design", SIGGRAPH '95: Proceedings of the 22nd Annual Conference on Computer Graphics and Interactive Techniques, Sep. 1995, 8 pages.
Torok, et al., "REDengine 3 Character Pipeline", Retrieved from Internet: http://fileserv.polter.pl/1594-CDPRED_SIGGRAPH.pdf, 2013, 53 pages.
USPTO, Written Opinion for International Patent Application No. PCT/US2022/015246, May 11, 2022, 12 pages.
USPTO, International Search Report for International Patent Application No. PCT/US2022/015246, May 11, 2022, 2 pages.
USPTO, Non-final Office Action for U.S. Appl. No. 17/375,066, May 24, 2022, 15 pages.
USPTO, Notice of Allowance for U.S. Appl. No. 17/375,066, Nov. 8, 2022, 9 pages.
Vaisse, "Ubisoft Cloth Simulation: Performance Postmortem and Journey from C++ to Computer Shaders", Retrieved from Internet: https://www.gdcvault.com/play/1022421/Ubisoft-Cloth-Simulation-Performance-Postmortem, 2015, 97 pages.
Wang, et al., "Delaunay graph-based moving mesh method with damping functions", Chinese Journal of Aeronautics, vol. 31, Issue 11, Nov. 2018, pp. 2093-2103.
Wang, et al., "Mesh deformation on 3D complex configurations using multistep radial basis functions interpolation", Chinese Journal of Aeronautics, 31(4), 2018, pp. 660-671.
USPTO, International Search Report for International Patent Application No. PCT/US2022/046528, Jan. 31, 2023, 2 pages.
USPTO, Written Opinion for International Patent Application No. PCT/US2022/046528, Jan. 31, 2023, 6 pages.
USPTO, Written Opinion for International Patent Application No. PCT/US2022/046523, Feb. 8, 2023, 11 pages.
Uspto, International Search Report for International Patent Application No. PCT/US2022/046523, Feb. 8, 2023, 2 pages.
USPTO, Non-final Office Action for U.S. Appl. No. 17/965,213, Mar. 11, 2024, 16 pages.
USPTO, Non-Final Office Action in U.S. Appl. No. 18/189,682, Dec. 31, 2024, 23 pages.
JPO, Notice of Allowance (with English translation) in Japanese Patent Application No. 2023-556822, Mar. 11, 2025, 5 pages.
"Korean Office Action in Application No. 10-2023-7035187", Apr. 29, 2025.
Shiyi Huang, "Customized 3D Clothes Modeling for Virtual Try-On System Based on Multiple Kinects", 2015, 133 pages.
"Korean Office Action In Application No. 10-2024-7009361", Jul. 14, 2025.
"Communication under Rule 70(2) and 70a(2) EPC mailed in EP Application No. 22881757.3", Aug. 8, 2025, 1 page.

(56) References Cited

OTHER PUBLICATIONS

"Extended European Search Report in EP Application No. 22881757.3", Jul. 22, 2025, 11 pages.
Anonymous, "Shading," Wikipedia, Oct. 1, 2021 (Oct. 1, 2021), pp. 1-9, XP093292046, Retrieved from the Internet: URL:https://web.archive.org/web/20211001215824/https://en.wikipedia.org/wiki/Shading [retrieved on Jul. 2, 2025].
Ilya Baran, et al., "Automatic rigging and animation of 3D characters," Computer Graphics. Siggraph 2000 Conference Proceedings. New Orleans, LA, Jul. 23-28, 2000; [Computer Graphics Proceedings. Siggraph], New York, NY : ACM, US, Jul. 29, 2007 (Jul. 29, 2007), pp. 72-es, XP059142238.
Ilya Baran, et al., "Automatic rigging and animation of 3D characters—Supplementary Material—pps108.mp4," Jul. 29, 2007 (Jul. 29, 2007), XP093292227, Retrieved from the Internet: URL:https://dl.acm.org/doi/suppl/10.1145/175808.1276467/suppl_file/pps108.mp4.
Jakub Fiser, et al., "StyLit: Illumination-Guided Example-Based Stylization of 3D Renderings," Acm Transactions On Graphics, ACM, NY, US, vol. 35, No. 4, Jul. 11, 2016 (Jul. 11, 2016), pp. 1-11, XP058684893, ISSN: 0730-0301, DOI: 10.1145/2897824.2925948.
"Notice of Allowance in JP Application No. 2025-65102", Oct. 7, 2025.
"Communication pursuant to Rules 70(2) and 70a(2) EPC in EP Application No. 2281756.5", Sep. 23, 2025.
"Extended European Search Report in EP Application No. 22881756.5", Sep. 5, 2025.
Vladimir Lazunin, et al., "Interactive Visualization of Multi-Layered Clothing", Visual Computer, Springer, Berlin, DE, vol. 33, No. 1, XP036131806, ISSN: 0178-2789, DOI: 10.1007/S00371-015-1153-4, Sep. 4, 2015.

\* cited by examiner

INFERRED SKELETAL STRUCTURE FOR PRACTICAL 3D ASSETS

CROSS-REFERENCE TO RELATED APPLICATIONS

This application is a non-provisional application that claims priority under 35 U.S.C. § 119(e) to U.S. Provisional Patent Application No. 63/255,489, filed on Oct. 14, 2021 and to U.S. Provisional Patent Application No. 63/404,871, filed on Sep. 8, 2022, both of which are hereby incorporated by reference herein in their entireties.

TECHNICAL FIELD

Embodiments relate generally to online virtual experience platforms, and more particularly, to methods, systems, and computer readable media for creating an inferred skeletal structure for practical 3D assets.

BACKGROUND

Online platforms, such as virtual experience platforms and online gaming platforms, can include avatars and avatar editing suites for use by users and developers.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Aspects of this disclosure are directed to methods, systems, and computer readable media to create inferred skeletal structures for practical 3D assets.

In one aspect, a computer-implemented method is described. The computer-implemented method may include receiving an avatar data model for a three-dimensional (3D) avatar, the avatar data model comprising at least a first body part from a first parent model, and a second body part from a second parent model, wherein the first parent model and the second parent model are different 3D models; creating a graph representation for the avatar data model, wherein the graph representation begins at a selected root point for the avatar data model and extends to terminal portions of the avatar data model; traversing the graph representation to determine a plurality of joint locations, wherein the joint locations each represent a respective location where a joint is to be placed, and wherein the joint locations are determined based on intersections of different body parts, descriptions of different body parts, or connections between different body parts; inferring a skeletal structure between the plurality of joint locations such that for all joints, a skeletal portion extends between a first joint and a second joint, and that skeletal portion rotates by motion of one or both of the first joint and the second joint; and combining joints at each of the plurality of joint locations, the inferred skeletal structure, and the avatar data model to create a practical 3D asset.

Various implementations of the computer-implemented method are described.

In some implementations, the computer-implemented method further comprises animating the practical 3D asset in a virtual environment of a virtual experience.

In some implementations, animating the practical 3D asset comprises utilizing the inferred skeletal structure for skin deformations during animation of the practical 3D asset.

In some implementations, the graph representation comprises a plurality of nodes representing individual body parts of the avatar data model.

In some implementations, the graph representation further comprises a plurality of edges, wherein each edge of the plurality of edges extends between at least two nodes, and wherein each edge of the plurality of edges represents a joint location.

In some implementations, each joint combined at the plurality of joint locations comprises either an animated joint or a fixed joint.

In some implementations, the computer-implemented method further comprises skinning the practical 3D asset based upon at least the inferred skeletal structure.

In some implementations, traversing the graph representation comprises one or more of: a depth first search or a breadth first search.

In some implementations, the graph representation comprises a weighted graph having weights assigned to edges based upon a scale of individual body parts of the avatar data model.

In some implementations, one or more of the first parent model or the second parent model are user-generated content of a virtual experience platform.

In another aspect, a system is described. The system may include a memory with instructions stored thereon; and a processing device, coupled to the memory and operable to access the memory, wherein the instructions when executed by the processing device, cause the processing device to perform operations including: receiving an avatar data model for a three-dimensional (3D) avatar, the avatar data model comprising at least a first body part from a first parent model, and a second body part from a second parent model, wherein the first parent model and the second parent model are different 3D models; creating a graph representation for the avatar data model, wherein the graph representation begins at a selected root point for the avatar data model and extends to terminal portions of the avatar data model; traversing the graph representation to determine a plurality of joint locations, wherein the joint locations each represent a respective location where a joint is to be placed, and wherein the joint locations are determined based on intersections of different body parts, descriptions of different body parts, or connections between different body parts; inferring a skeletal structure between the plurality of joint locations such that for all joints, a skeletal portion extends between a first joint and a second joint, and that skeletal portion rotates by motion of one or both of the first joint and the second joint; and combining joints at each of the plurality of joint locations, the inferred skeletal structure, and the avatar data model to create a practical 3D asset.

Various implementations of the system are described.

In some implementations, the operations further comprise animating the practical 3D asset in a virtual environment of a virtual experience.

In some implementations, animating the practical 3D asset comprises utilizing the inferred skeletal structure for skin deformations during animation of the practical 3D asset.

In some implementations, the graph representation comprises a plurality of nodes representing individual body parts of the avatar data model.

In some implementations, the graph representation further comprises a plurality of edges, wherein each edge of the plurality of edges extends between at least two nodes, and wherein each edge of the plurality of edges represents a joint location.

In some implementations, each joint combined at the plurality of joint locations comprises either an animated joint or a fixed joint.

In some implementations, the operations further comprise skinning the practical 3D asset based upon at least the inferred skeletal structure.

In some implementations, traversing the graph representation comprises one or more of: a depth first search or a breadth first search.

In some implementations, the graph representation comprises a weighted graph having weights assigned to edges based upon a scale of individual body parts of the avatar data model.

In another aspect, a non-transitory computer-readable medium is described. The non-transitory computer-readable medium may include instructions stored thereon that, responsive to execution by a processing device, causes the processing device to perform operations comprising: receiving an avatar data model for a three-dimensional (3D) avatar, the avatar data model comprising at least a first body part from a first parent model, and a second body part from a second parent model, wherein the first parent model and the second parent model are different 3D models; creating a graph representation for the avatar data model, wherein the graph representation begins at a selected root point for the avatar data model and extends to terminal portions of the avatar data model; traversing the graph representation to determine a plurality of joint locations, wherein the joint locations each represent a respective location where a joint is to be placed, and wherein the joint locations are determined based on intersections of different body parts, descriptions of different body parts, or connections between different body parts; inferring a skeletal structure between the plurality of joint locations such that for all joints, a skeletal portion extends between a first joint and a second joint, and that skeletal portion rotates by motion of one or both of the first joint and the second joint; and combining joints at each of the plurality of joint locations, the inferred skeletal structure, and the avatar data model to create a practical 3D asset.

Various implementations of the non-transitory computer-readable medium are described.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
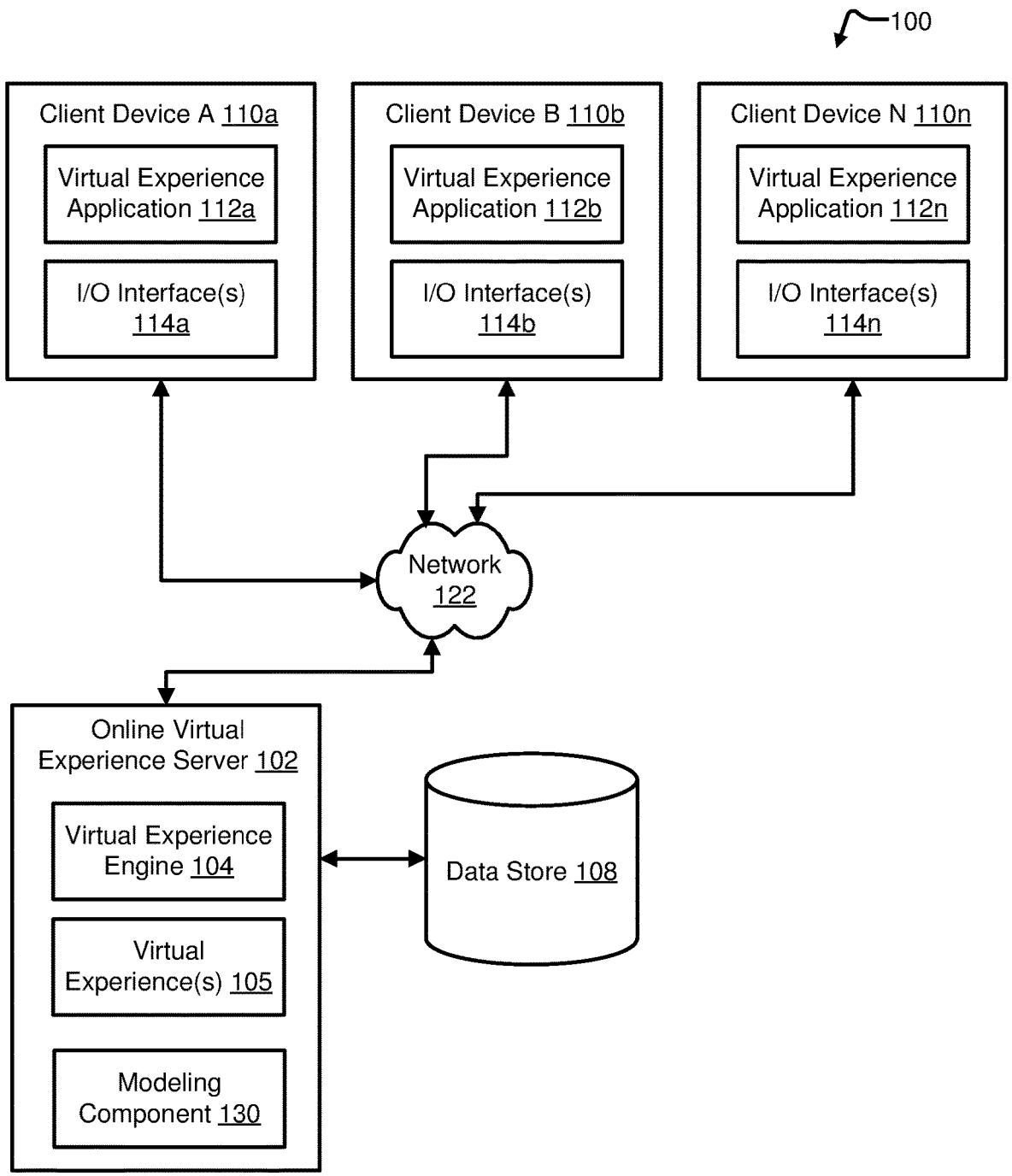
FIG. 1 is a diagram of an example network environment, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

Various embodiments are described herein in the context of 3D avatars that are used in a 3D virtual experience or environment. Some implementations of the techniques described herein may be applied to various types of 3D environments, such as a virtual reality (VR) conference, a 3D session (e.g., an online lecture or other type of presentation involving 3D avatars), a virtual concert, an augmented reality (AR) session, or in other types of 3D environments that may include one or more users that are represented in the 3D environment by one or more 3D avatars.

In some aspects, systems and methods are provided for manipulating 3D assets and creating new practical assets. For example, practical 3D assets are 3D assets that are one or more of: easy to animate with low computational load, suitable for visual presentation in a virtual environment on a client device of any type, suitable for multiple different forms of animation, suitable for different skinning methodologies, suitable for different skinning deformations, and/or suitable for animation on various client devices. Online platforms, such as online virtual experience platforms, generally provide an ability to create, edit, store, and otherwise manipulate virtual items, virtual avatars, and other practical 3D assets to be used in virtual experiences.

For example, virtual experience platforms may include user-generated content or developer-generated content (each referred to as "UGC" herein). The UGC may be stored and implemented through the virtual experience platform, for example, by allowing users to search and interact with various virtual elements to create avatars and other items. Users may select and rearrange various virtual elements from various virtual avatars and 3D models to create new models and avatars. Avatar body creators can create bodies having geometries of any desired/customized shape and size, and publish the bodies in a body library hosted by the virtual experience platform.

At runtime during a virtual experience or other 3D session, a user accesses the body library to select a particular body (including various parts such as head, torso, limbs, etc.), and to rearrange the body (or parts thereof). According to implementations described herein, the virtual experience platform may take as input the overall model of the body (or parts thereof) and infer a skeletal structure that allows for appropriate motion (e.g., joint movement, rotation, etc.). In this manner, many different avatar body parts may be rearranged to create new avatar bodies without detracting from a user experience.

For example, user generated content may include a first data model and a second data model. A user may create a new avatar data model by mixing one or more body parts from the first data model and the second data model (taking different body parts from the first and second data models, and optionally, from additional data models). It follows, that as various data models for avatars may have different types, scales, sizes, and structure of body parts, the new avatar data model may not have joints, seams, connection points, connections, and/or other portions that are in proper alignment for practical 3D animation using the new avatar data model.

For example, the new avatar data model may have misaligned seams that cause improper skinning deformations during animations that detract from a user experience. In another example, the new avatar data model may have misaligned animated joints that cause skeletal structures to improperly inform skinning deformations that detract from the user experience. In another example, the new avatar data model may have too many or too few animated joints to implement motion in animation that is preferable for engaging experiences. Moreover, the new avatar data model may have other misaligned, improper, or other elements that detract from an engaging user experience and smooth animation. In different examples, two or more of the foregoing defects may exist in the new avatar data model.

According to some implementations, the new avatar data model may be analyzed to determine different body parts and a graph representation may be created to represent the different body parts based on the analysis. The graph representation may be traversed with a search algorithm to accurately determine new joint locations that coincide more closely with the different, mixed body parts and/or elements. Animated joints or fixed joints (depending upon the parent body part model) may be placed at the determined joint locations. Skeletal structure may be inferred to exist between joints such that each joint comprises at least one connected skeletal member. The new joints and the inferred skeletal structure may be combined with the new avatar data model to create a practical 3D asset that includes a correct number of joints and properly aligned elements such that animation may be engaging and fluid.

In this manner, implementations provide the benefit of reducing computational resources associated with users attempting to manually align new joints and skeletal structures in 3D avatar models. Implementations also provide the technical benefit of automating much of the 3D model creation process such that users may concentrate on creation of unique avatars rather than esoteric computer animation dependencies. Implementations also provide the technical benefits of improving user experiences, greater cross-platform compatibility of new avatar models, greater compatibility of new avatar models across multiple virtual experiences, lowering a barrier to entry in 3D modeling for inexperienced users, improving user engagement metrics, and other technical benefits.

FIG. 1: System Architecture

FIG. 1 illustrates an example network environment 100, in accordance with some implementations of the disclosure. FIG. 1 and the other figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral (e.g., "110" in the text refers to reference numerals "110*a*," "110*b*," and/or "110*n*" in the figures).

The network environment 100 (also referred to as a "platform" herein) includes an online virtual experience server 102, a data store 108, and client devices 110*a-n* (referred to as client devices 110), all coupled via a network 122.

The online virtual experience server 102 can include, among other things, a virtual experience engine 104, one or more virtual experiences 105, and a modeling component 130. The online virtual experience server 102 may be configured to provide virtual experiences 105 to one or more client devices 110, and to provide automatic generation of inferred skeletal structures via the modeling component 130, in some implementations.

Data store 108 is shown coupled to online virtual experience server 102 but in some implementations, can be provided as part of the online virtual experience server 102. The data store may, in some implementations, be configured to store advertising data, user data, engagement data, and/or other contextual data in association with the modeling component 130. All data are stored with specific user permissions and in compliance with applicable regulations.

The client devices 110 (e.g., 110*a*, 110*b*, 110*n*) can include a virtual experience application 112 (e.g., 112*a*, 112*b*, 112*n*) and an I/O interface 114 (e.g., 114*a*, 114*b*, 114*n*), to interact with the online virtual experience server 102, and to view, for example, graphical user interfaces (GUI) through a computer monitor, a television, a tablet/laptop screen, or other display (e.g., a wearable display such as virtual reality goggles, or other wearable device) (not illustrated). In some implementations, the client devices 110 may be configured to execute and display virtual experiences, which may include customized avatar data models and practical 3D assets as described herein.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, virtual server, etc.). In some implementations, a server may be included in the online virtual experience server 102, be an independent system, or be part of another system or platform. In some implementations, the online virtual experience server 102 may be a single server, or any combination a plurality of servers, load balancers, network devices, and other components. The online virtual experience server 102 may also be implemented on physical servers, but may utilize virtualization technology, in some implementations. Other variations of the online virtual experience server 102 are also applicable.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user (e.g., via client device 110) with access to online virtual experience server 102.

The online virtual experience server 102 may also include a website (e.g., one or more web pages) or application back-end software that may be used to provide a user with access to content provided by online virtual experience server 102. For example, users (or developers) may access online virtual experience server 102 using the virtual experience application 112 on client device 110, respectively.

In some implementations, online virtual experience server 102 may include digital asset and digital virtual experience generation provisions. For example, the platform may provide administrator interfaces allowing the design, modification, unique tailoring for individuals, and other modification functions. In some implementations, virtual experiences may include two-dimensional (2D) games, three-dimensional (3D) games, virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the virtual experience server 102.

In some implementations, online virtual experience server 102 or client device 110 may include the virtual experience engine 104 or virtual experience application 112. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.).

The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110 (not illustrated). In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration, rather than limitation. In some implementations, any number of client devices 110 may be used.

In some implementations, one or more of client devices 110 may include an instance of the virtual experience application 112. The virtual experience application 112 may be rendered for interaction at the client device 110. During user interaction within a virtual experience or another GUI of the online platform 100, a user may create an avatar that includes different body parts from different libraries, from different parent models, and/or from other user-generated content. The modeling component 130 may take as input a data model representative of the newly created avatar, read all individual parts information, and infer a skeletal structure that may be used to create a practical 3D asset having an internal skeletal structure allowing for animation within a virtual experience.

In some implementations, an inferred skeletal structure refers to virtual bones suspended between joints. The joints inform motion of the virtual bones such that the virtual bones rotate, move, or otherwise pivot on the joints.

In some implementations, joints may include both fixed and animated joints. Other forms of joints may be applicable. Some implementations include joints that pivot on a single axis, joints that pivot on one or more axes, joints that pivot on two or more axes, joints that pivot on a plurality of axes, joints that pivot only within a single plane of motion, joints that pivot within one or more planes of motion, joints that pivot within two or more planes of motion, and/or joints that remain fixed in all planes but rotate along a single axis of rotation.

In some implementations, joints can be dynamic and physically simulated too. For example, the joints can be simulated joints simulated based upon: ball sockets, hinges, and/or rods. These and other simulated joints allow the implicitly combined skinned character model to be fully or partially physically simulated, where the body parts can move independently reacting to a physics simulation (e.g. the character can be a single rigid body or multiple rigid bodies). Additionally, in some implementations, the platform 100 and modeling component 130 implicitly support the full body or parts of the body being simulated as soft, deformable bodies. For example, as long as there is a skeletal structure with skinning nodes, shared nodes can be linked in the separate parts together into a single combined skinned entity inferred based on the physical joints used by the simulator, or also linked more directly and explicitly with explicit skeletal graph links combining multiple skeleton nodes together explicitly specified by the user.

The inferred skeletal structure may be integrated with joints such that each joint includes at least one skeletal structure and/or portion thereof (e.g., an individual virtual bone) connected thereto. In some implementations, joints may include one or more virtual bones connected thereto. In some implementations, joints may include two or more virtual bones connected thereto. In some implementations, joints may be connected to another joint and at least one virtual bone. In some implementations, joints may be connected to one or more joints and at least one virtual bone.

The inferred skeletal structure (e.g., all virtual bones) and the joints may be combined with an avatar data model to generate a practical 3D asset. The combining may be effectuated by the modeling component 130 or another software component. The combining may be performed at a client device 110 (e.g., through VE application 112 or a local instance of the modeling component 130), in some implementations.

The practical 3D asset generated through the platform 100 may be stored at any suitable storage device, including distributed storage devices, hardware storage devices, logical storage devices, etc., and may be transmitted to client devices 110 in some implementations. The data store 108 may store and index different practical 3D assets generated through use of the platform 100, such that client devices 110 may readily search and acquire practical 3D assets. The acquired practical 3D assets may be manipulated further to create new and unique avatars, and may subsequently be processed through the methodologies described herein to create new, unique 3D assets for use in animation, gameplay, or other use at the platform 100 or other platforms.

Figure 2:
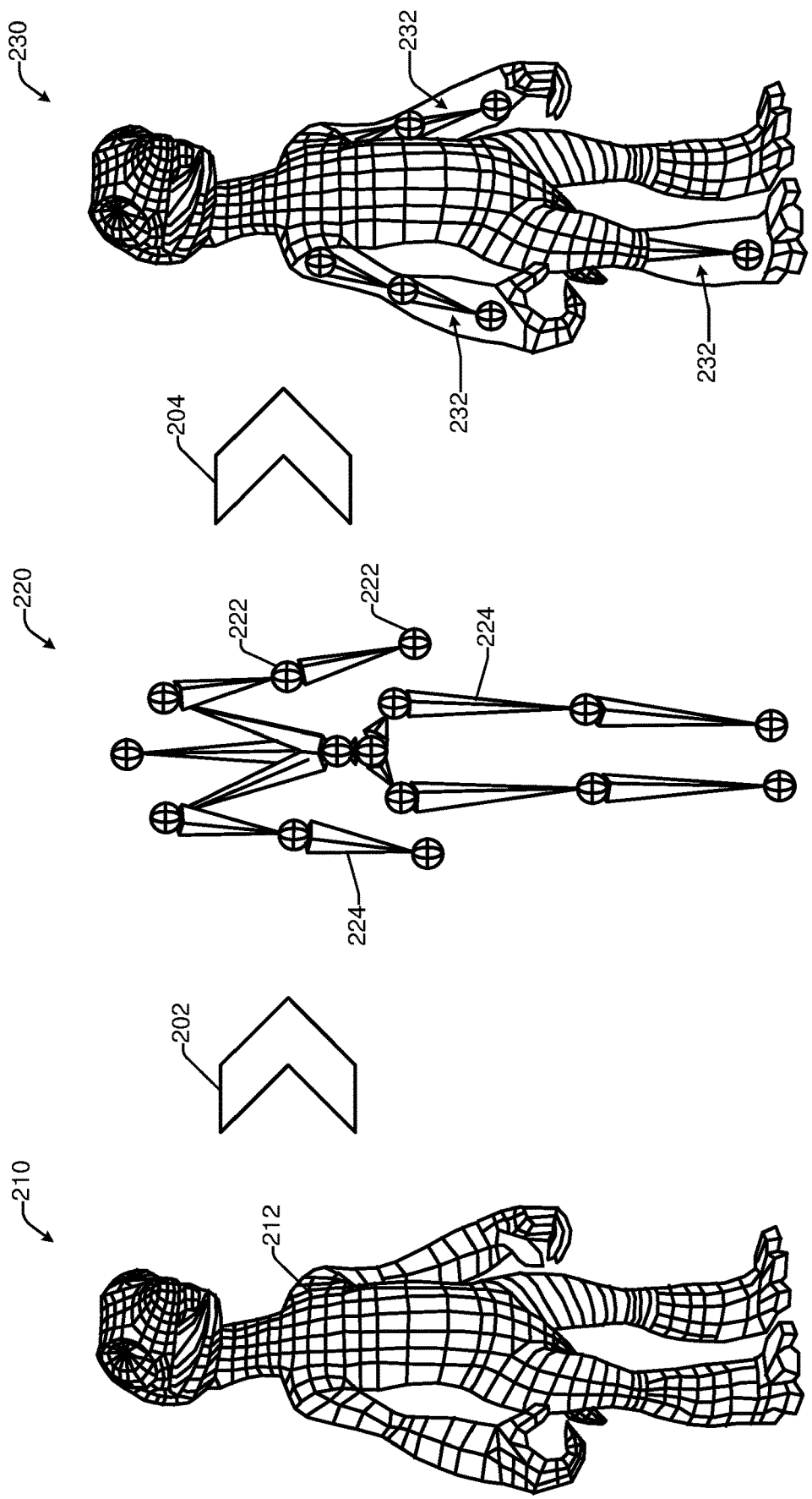
FIG. 2 depicts an example progression from an input avatar data model to a practical 3D asset, in accordance with some implementations.

FIG. 2: Example Generation of 3D Asset

FIG. 2 depicts an example progression from an input avatar data model to a practical 3D asset, in accordance with some implementations. As illustrated, a customized avatar data model 210 may include a body cage or mesh 212 that defines an exterior of the model.

The customized avatar data model may be created by a user of online virtual experience platform 100 from two or more different parent models. For example, a user may choose arms, legs, heads, torsos, etc., from different models and add them together to arrive at the customized avatar data model 210.

The online virtual experience platform 100 may receive the customized avatar data model 210 and perform a first sequence of operations 202 to generate an inferred skeletal structure 220. The inferred skeletal structure 220 may include a plurality of joints 222 (only a subset is labeled in FIG. 2) and a plurality of virtual bones 224 (only a subset is labeled in FIG. 2). In some implementations, the modeling component 130 performs the first sequence of operations 202. The first sequence of operations 202 may also be distributed amongst several different instances of the modeling component 130 and/or other software components of the online virtual experience platform 100.

The online virtual experience platform may perform a second sequence of operations 204 to combine the plurality of joints 222, the plurality of virtual bones 224, and the customized avatar data model 210, to obtain a practical 3D asset 230.

The practical 3D asset 230 may be a 3D asset having a defined skeletal structure whereby the modeling component 130 (or another software component) may perform skinning deformations for animation sequences based upon the defined skeletal structure. For example, cutaways 232 allow a view beneath the body cage or mesh 212 to view the underlying skeletal structure and joints as arranged in the practical 3D asset 230.

Hereinafter, a more detailed discussion of a method to generate a practical 3D asset is presented with reference to FIG. 3.

Figure 3:
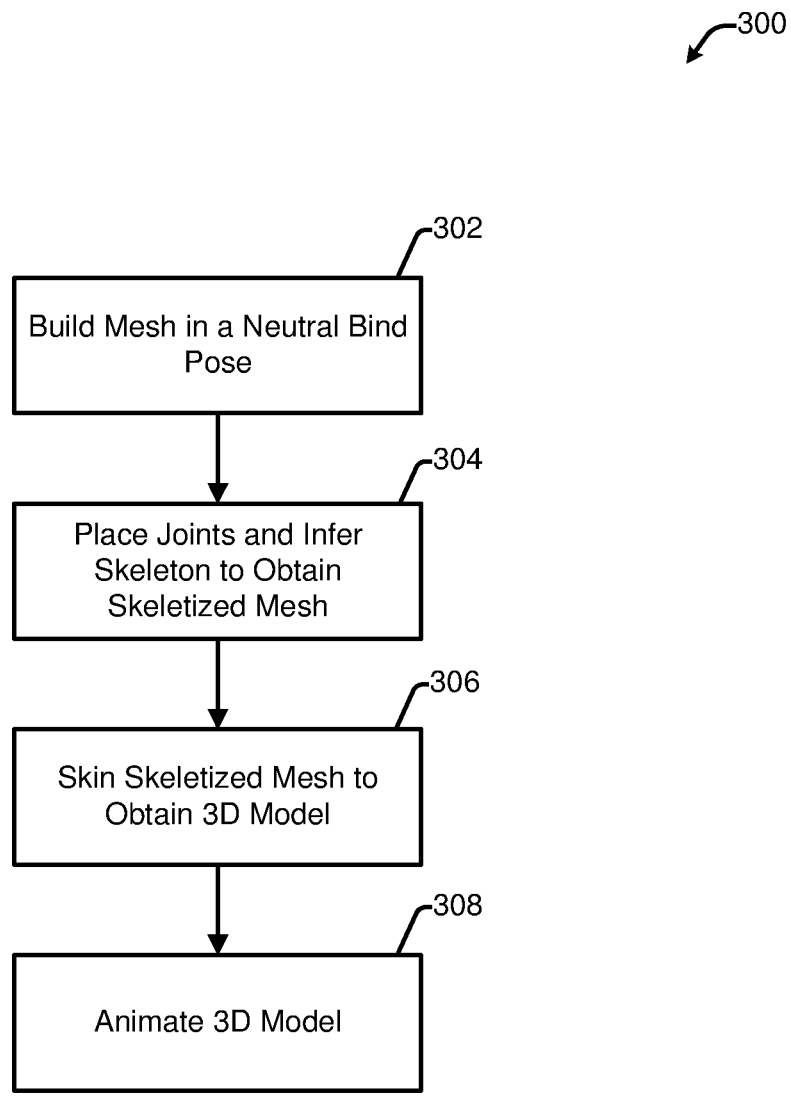
FIG. 3 is a flowchart of an example method to generate a practical 3D asset from an input avatar data model, in accordance with some implementations.

FIG. 3: Example Method to Generate 3D Asset with Inferred Skeletal Structure FIG. 3 is a flowchart of an example method 300 to generate a practical 3D asset from an input avatar data model, in accordance with some implementations;

In some implementations, method 300 can be implemented, for example, on a server 102 described with reference to FIG. 1. In some implementations, some or all of the method 300 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices or server devices) that can send results or data to the first device.

In some implementations, the method 300, or portions of the method, can be initiated automatically by a system. In some implementations, the implementing system is a first device. For example, the method (or portions thereof) can be periodically performed, or performed based on one or more particular events or conditions, e.g., upon a user request, upon a change in avatar dimensions, upon a change in avatar body pieces, a predetermined time period having expired since the last performance of method 300 for a particular avatar model or user, and/or one or more other conditions occurring which can be specified in settings read by the method.

Method 300 may begin at block 302. At block 302, a body mesh is constructed, e.g., in a neutral bind pose. The neutral bind pose is a base (or rest) pose of an avatar. For example, when an avatar's skeleton is moved after skinning, the skeleton's actions deform the skin. A pose that does not cause deformations to the skin is the neutral bind pose. Accordingly, in some implementations, the body mesh is first built in the neutral bind pose which can simplify later operations.

Figure 4:
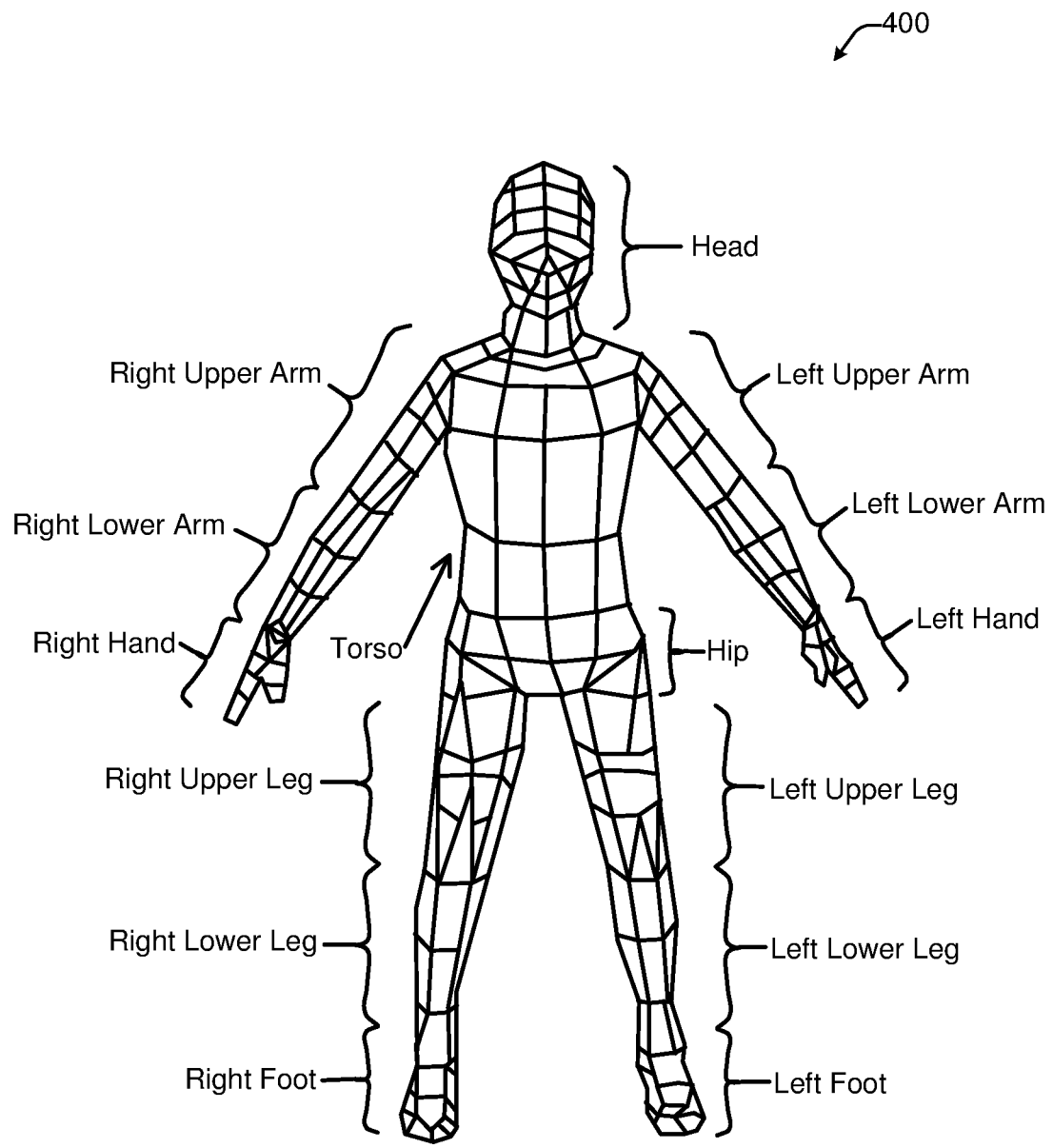
FIG. 4 is a schematic of an example visualization of a basic avatar data model, in accordance with some implementations.
Figure 5:
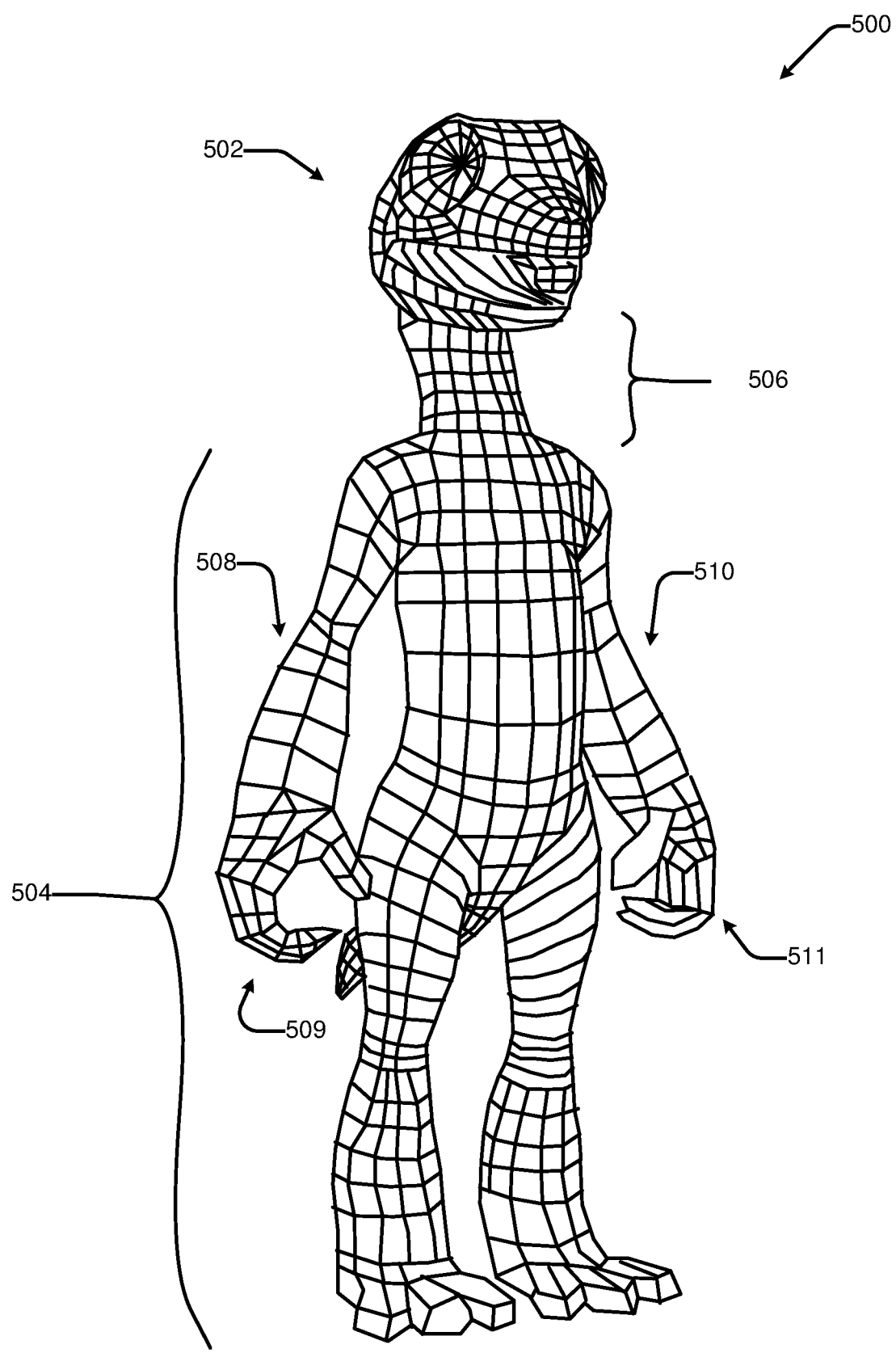
FIG. 5 is a schematic of an example customized avatar data model, in accordance with some implementations.

In some implementations, the body mesh may be constructed in an alternate but neutral rest pose with reduced or minimal deformations. In these and other implementations, the neutral pose may be chosen based upon a likelihood that a skinned version of the avatar has minimal deformations in this pose. For example, FIG. 4 depicts an alternate neutral pose while FIG. 5 depicts a neutral bind pose. Block 302 may be followed by block 304.

At block 304, joints may be placed and a skeleton may be inferred based on the joint placement, to obtain a skeletized mesh. For example, joints may be placed based upon one or more of: intersections of different body parts, descriptions of different body parts, or connections between different body parts.

Intersections of different body parts may include an intersection between a first body part (such as an upper arm) and a second body part (such as a lower arm), with the joint placed at or proximal this intersection.

Descriptions of different body parts may include a text or computer-coded description of a first body part (such as an upper leg) and a second body part (such as a lower leg), with the joint placed between the first body part and second body part based upon the description. For example, the description may also include distal ends of each body part where joint placement is appropriate.

Connections between different body parts may include hard-coded descriptions of connections that may be replaced with joints.

The skeletized structure may be inferred based upon the joint locations. For example, as a joint may be placed between an upper arm and a lower arm, an inference of virtual bones extending from this joint and onto other body parts can be made. The inference is an intelligent inference based upon an established body structure. For example, a basic body with established structure may be a humanoid shape having about 15 parts. For example, FIG. 4 depicts a basic body and these example 15 body parts. Block 304 may be followed by block 306.

At block 306, the skeletized body mesh, having joints and virtual bones associated therewith, may be skinned to obtain a 3D model or practical 3D asset. The skinning may include any appropriate skinning methodology. For example, skinning methodologies may include, but are not limited to, linear blend skinning, inverse linear blend skinning, skeleton-subspace deformation, or other methods.

In some implementations, a weight map may be created for individual placed joints. The weight map may control how much each vertex is to move based upon the underlying skeletal structure.

In some implementations, the skinning may be performed based on a CPU skinning or graphics processing unit (GPU) skinning process. For example, CPU skinning may rely on a typical available hardware processor for skinning transformations. For example, GPU skinning may rely on a typical available GPU for skinning transformations. Block 306 may be followed by block 308.

At block 308, the 3D model or practical 3D asset may be animated, e.g., the 3D model may be utilized to render an animated avatar. For example, the animation may be rendered within a virtual environment within a virtual experience hosted on the virtual experience platform 100, in some implementations. The animation may be informed by the inferred skeletal structure such that skinning deformations are fluid, engaging, and with reduced artifacts, for example, as compared to misaligned skeletons.

Hereinafter, a basic avatar data model and body parts are described with reference to FIG. 4.

FIG. 4: Basic Avatar Data Model

FIG. 4 is a schematic of an example visualization of a basic avatar data model, in accordance with some implementations. The example visualization comprises a body cage 400 and several labeled body parts.

More particularly, the 15 body parts shown in FIG. 4 are (for a humanoid mannequin): head, torso, hip, right foot, left foot, left lower leg, right lower leg, left upper leg, right upper leg, left hand, right hand, left lower arm, right lower arm, left upper arm, and right upper arm. The number of parts in any body shape may be greater or fewer than the 15 body parts shown. For example, a "one-armed" avatar character might have 12 (as opposed to 15) body parts, due to the omission of a hand, lower arm, and upper arm. Furthermore, other body shapes may involve a fewer or greater numbers of body parts, depending on factors such as body geometry, desired resolution, processing capability, type of avatar character (e.g., animal, alien, monster, and so forth), etc.

Each of the 15 groups/parts in FIG. 4 includes feature points that define that part of the avatar body. Such group(s) of feature points can in turn be mapped to a corresponding underlying skeletal structure for inference. For example, the feature points in the body cage 400 that define the left/right lower arms, and the left/right upper arms, may be used to inform positioning of joints associated with elbows. Similarly, the left/right upper legs, and the left/right lower legs, may be used to inform positioning of joints associated with knees.

Moreover, this separation into multiple groups (such as shown in FIG. 4) enables inference of a skeletal structure that can be used to accurately skin and animate a 3D model.

Hereinafter, customized avatar data models based upon two or more different parent models are described with reference to FIG. 5.

FIG. 5: Customized Avatar Data Model

FIG. 5 is a schematic of an example visualization of a customized avatar data model, in accordance with some implementations. The example visualization comprises a body cage 500 with a head 502, neck 506, torso and legs 504 from a first parent model, and arms 508, 510, hands 509, 511 from a second parent model.

Figure 6:
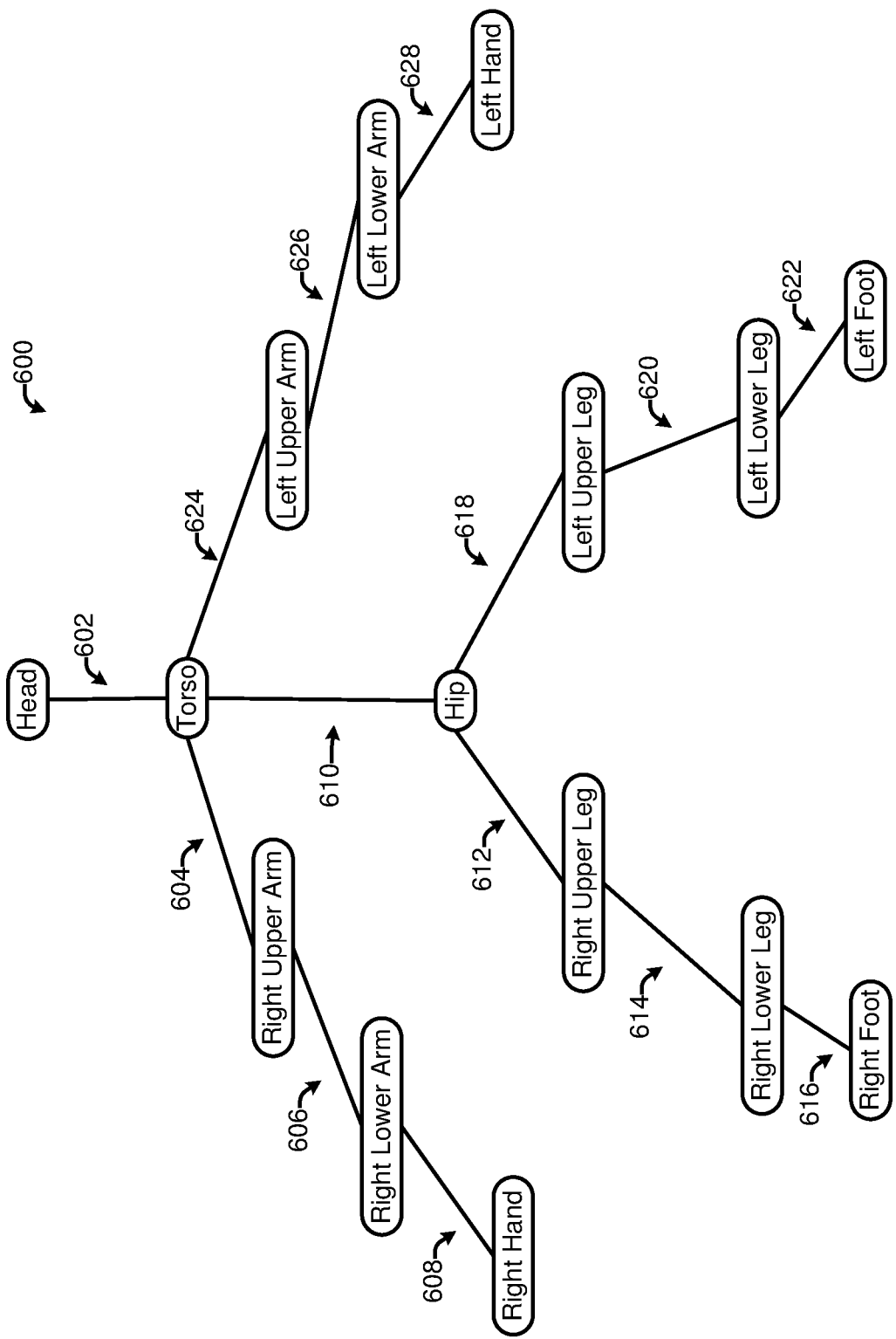
FIG. 6 is a diagram of an example graph representation of an avatar data model, in accordance with some implementations.

As each of the illustrated arms 508, 510 are from a different parent model than the head, neck, torso, and legs, existing skeletal structure in the model does not enable proper skinning. Accordingly, any skinning deformations based on such mismatched parts may look foreign or unnatural to a user. However, based on the techniques described herein, a new skeletal structure may be inferred by first generating a graph representation of the different body parts. FIG. 6 illustrates a diagram of an example graph representation.

FIG. 6: Example Graph Representation of Customized Avatar Data Model

FIG. 6 is a diagram of an example graph representation 600 of an avatar data model, in accordance with some implementations. As illustrated, the graph 600 includes a plurality of nodes that are labeled according to a corresponding body parts. In some implementations, each graph representation will have a number of nodes equal to a number of body parts. In this example 15 body parts are analyzed from the customized model 500.

Each body parts may have at least one associated edge that extends to another body part. Edges in the graph representation 600 are labeled 602, 604, 606, 608, 610, 612, 614, 616, 618, 620, 624, 626, and 628. In this example, each edge corresponds to a particular joint placement. Accordingly, each edge 602-628 may have a joint associated therewith. Similarly, each node that includes two or more edges may have one or more virtual bones inferred therebetween. In this manner, joints may be placed at edges 602-628 and virtual bones may be placed to roughly coordinate with non-distal nodes. Moreover, virtual bones may be scaled based upon the customized avatar data model and associated body parts. For example, FIG. 7 illustrates an example inferred skeletal structure based upon the customized data model 500.

Figure 7:
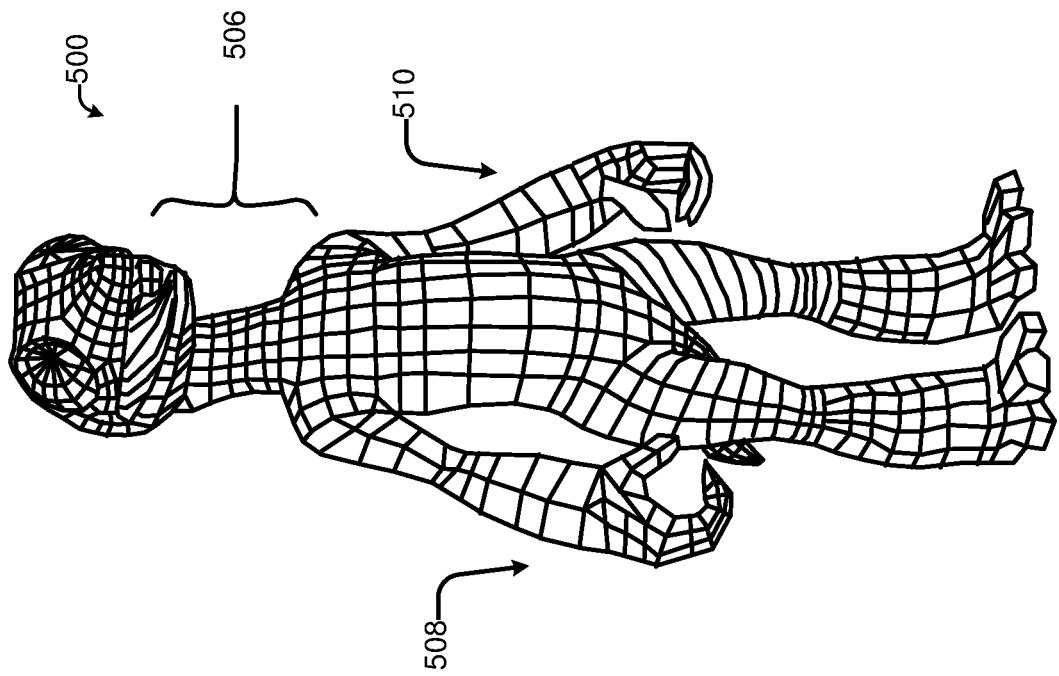
FIG. 7 is a schematic of an example inferred skeletal structure based on an input customized avatar data model, in accordance with some implementations.
Figure 7:
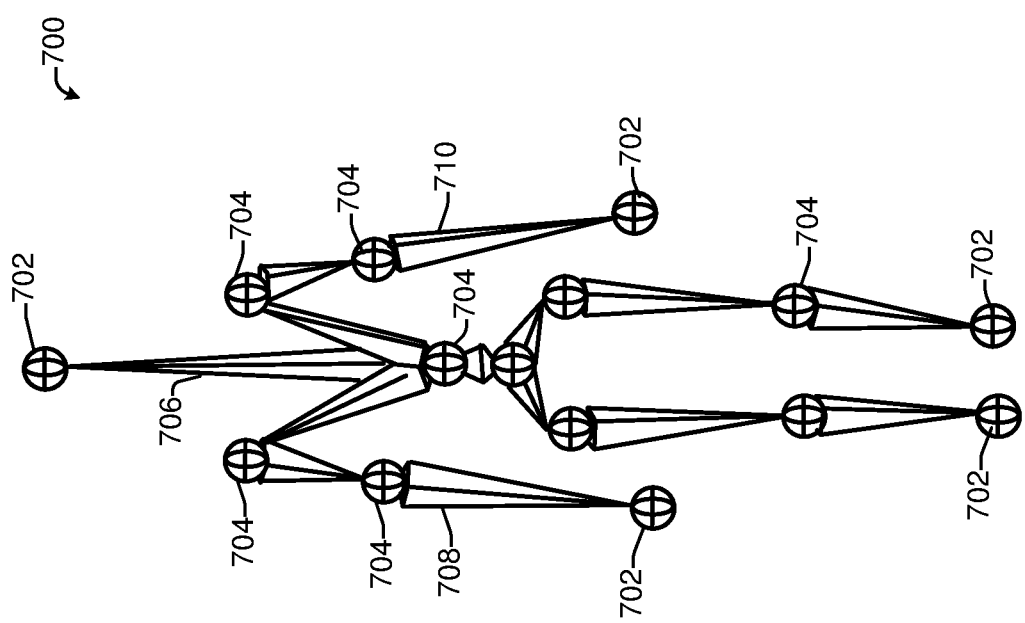

FIG. 7: Example Inferred Skeletal Structure

FIG. 7 is a schematic of an example inferred skeletal structure based on an input customized avatar data model, in accordance with some implementations. The inferred skeletal structure 700 may include one or more distal joints 702 associated with terminal portions of the avatar data model 500, and one or more internal joints 704 associated with non-terminal portions of the avatar data model 500.

As further shown, an elongated neck bone 706 may be inferred in this example, to correspond with the elongated neck portion 506 of the input model 500 (shown in an adjacent view for clarity). Furthermore, elongated lower arm bones 708 and 710 may be inferred in this example, to correspond with the elongated lower arms 508, 510 from the second parent model.

Accordingly, while the avatar data model 500 is created using different body parts from different parent models, the inferred skeletal structure 700 may be an appropriate skeletal structure to achieve smooth animation with accurate skinning and skinning deformations during animation.

Hereinafter, a detailed description of an example method to generate a practical 3D asset from an input customized avatar data model is presented with reference to FIG. 8.

Figure 8:
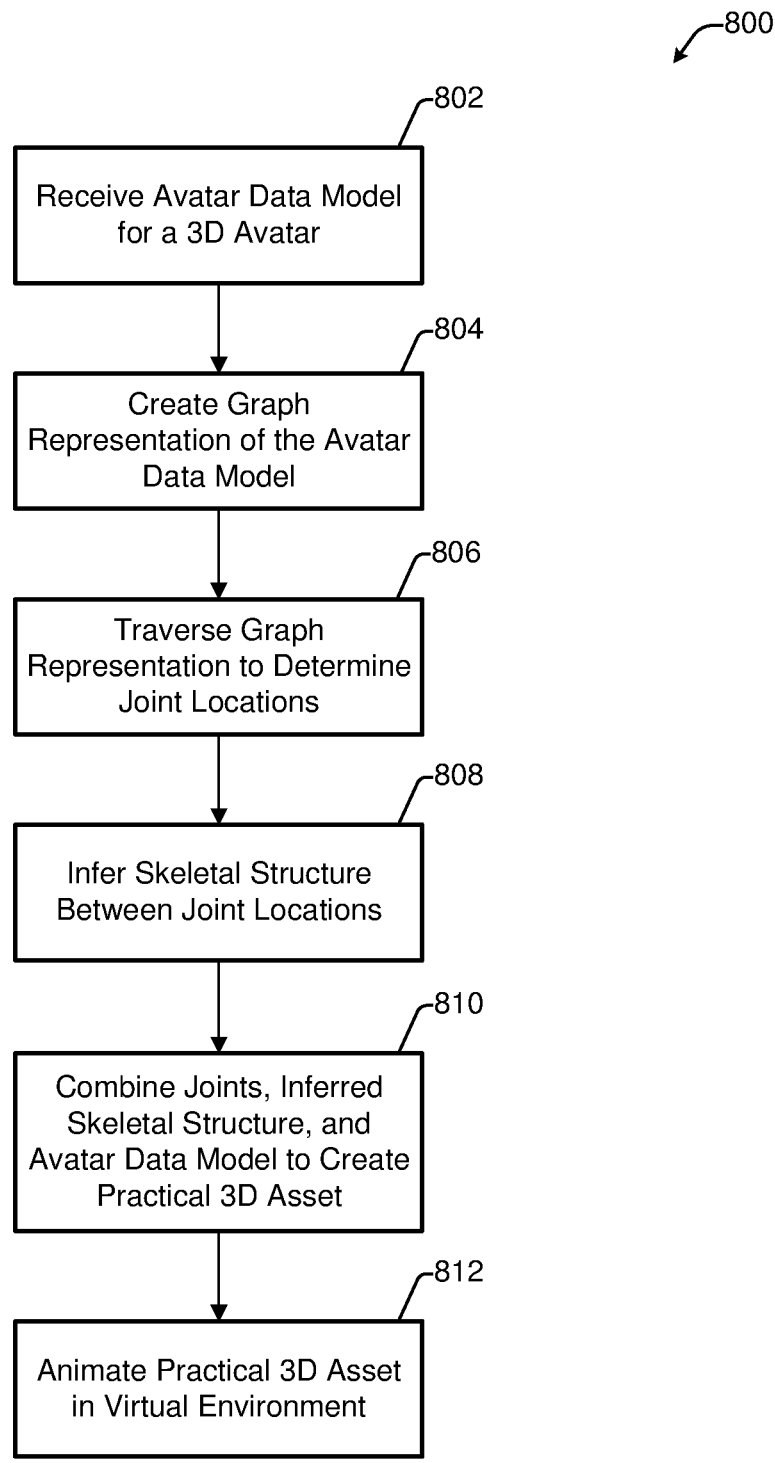
FIG. 8 is a flowchart of a method to generate a practical 3D asset from an input customized avatar data model, in accordance with some implementations.

FIG. 8: Method to Generate Practical 3D Asset from Customized Input Model

FIG. 8 is a flowchart of an example method 800 to generate a practical 3D asset from an input customized avatar data model, in accordance with some implementations.

In some implementations, method 800 can be implemented, for example, on a server 102 described with reference to FIG. 1. In some implementations, some or all of the method 800 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 800. In some examples, a first device is described as performing blocks of method 800. Some implementations can have one or more blocks of method 800 performed by one or more other devices (e.g., other client devices or server devices) that can send results or data to the first device.

In some implementations, the method 800, or portions of the method, can be initiated automatically by a system. In some implementations, the implementing system is a first device. For example, the method (or portions thereof) can be periodically performed, or performed based on one or more particular events or conditions, e.g., upon a user request, upon a change in avatar dimensions, upon a change in avatar body pieces, a predetermined time period having expired since the last performance of method 800 for a particular avatar model or user, and/or one or more other conditions occurring which can be specified in settings read by the method.

Method 800 may begin at block 802. At block 802, an avatar data model for a three-dimensional (3D) avatar may be received. The avatar data model may include at least a first body part from a first parent model, and a second body part from a second parent model.

In this example, the first parent model and the second parent model are different 3D models. It is noted that in some implementations the first parent model and the second parent model may be the same 3D model having different scales (e.g., larger arms or longer necks, but from the same model). In some implementations, the avatar data model may have parts from several different 3D models.

An upper limit on the number of different models may be chosen or selected based upon the implementation. For example, an upper limit of 15 different parent models may be selected if using avatars having a humanoid appearance. Avatars of different appearances (e.g., alien, robotic, animal, etc.) may have different upper limits on a number of body parts. Block 802 may be followed by block 804.

At block 804, a graph representation may be created for the avatar data model. For example, the graph representation may begin at a selected root point (e.g., the head, left foot, right hand, etc.) for the avatar data model and extends to terminal portions of the avatar data model (e.g., left/right foot, left/right hand, head, etc.).

In some implementations, the graph representation is a weighted graph having weights assigned to edges based upon a scale of individual body parts of the avatar data model. In this example, the scale of individual body parts may aid to inform inference of an underlying skeletal structure. Block 804 may be followed by block 806.

At block 806, the graph representation may be traversed to determine a plurality of joint locations. In some implementations, traversing the graph representation includes one or more of: a depth first search or a breadth first search. Other searching or tree traversal methods may also be applicable.

In some implementations, the joint locations represent a location where a joint is to be placed. Additionally, the joint locations may be determined based on intersections of different body parts, descriptions of different body parts, or connections between different body parts. Block 806 may be followed by block 808.

At block 808, a skeletal structure may be inferred between the plurality of joint locations. The inference may be such that a skeletal portion extends between a first joint and a second joint, and that skeletal portion rotates by motion or one or both of the first joint and the second joint, for different joints. In some implementations, the skeletal portions are virtual bones extending between at least two joints. Block 808 may be followed by block 810.

At block 810, joints at each of the plurality of joint locations, the inferred skeletal structure, and the avatar data model are combined to create a practical 3D asset. For example, data representations of the inferred skeletal structure and joints may be combined with the avatar data model such that the entire model may be used in animation. Block 810 may be followed by block 812.

At block 812, the practical 3D asset may be rendered in a virtual environment. The practical 3D asset may be animated within the virtual environment, e.g., the avatar may move (e.g., walk, run, jump, etc.); parts of the avatar body may move (e.g., hand wave, kick, arm raise, neck rotation, etc.). Additionally, the practical 3D asset may be stored at the online platform 100 for use by a plurality of users, in some implementations.

As described above, implementations relate to methods, systems, and computer-readable media for inferring a skeletal structure to create a practical 3D asset. A user may create an avatar using different parts from different parent models. Upon creation, a data model for the avatar is examined to determine joint placement and infer an overall skeletal structure. Thereafter, different skinning techniques may be used to deform the avatar skin during animations based on the joint placement and movement. The practical 3D asset may be stored, presented, and rendered through an online virtual experience platform accessible by a plurality of users.

Figure 9:
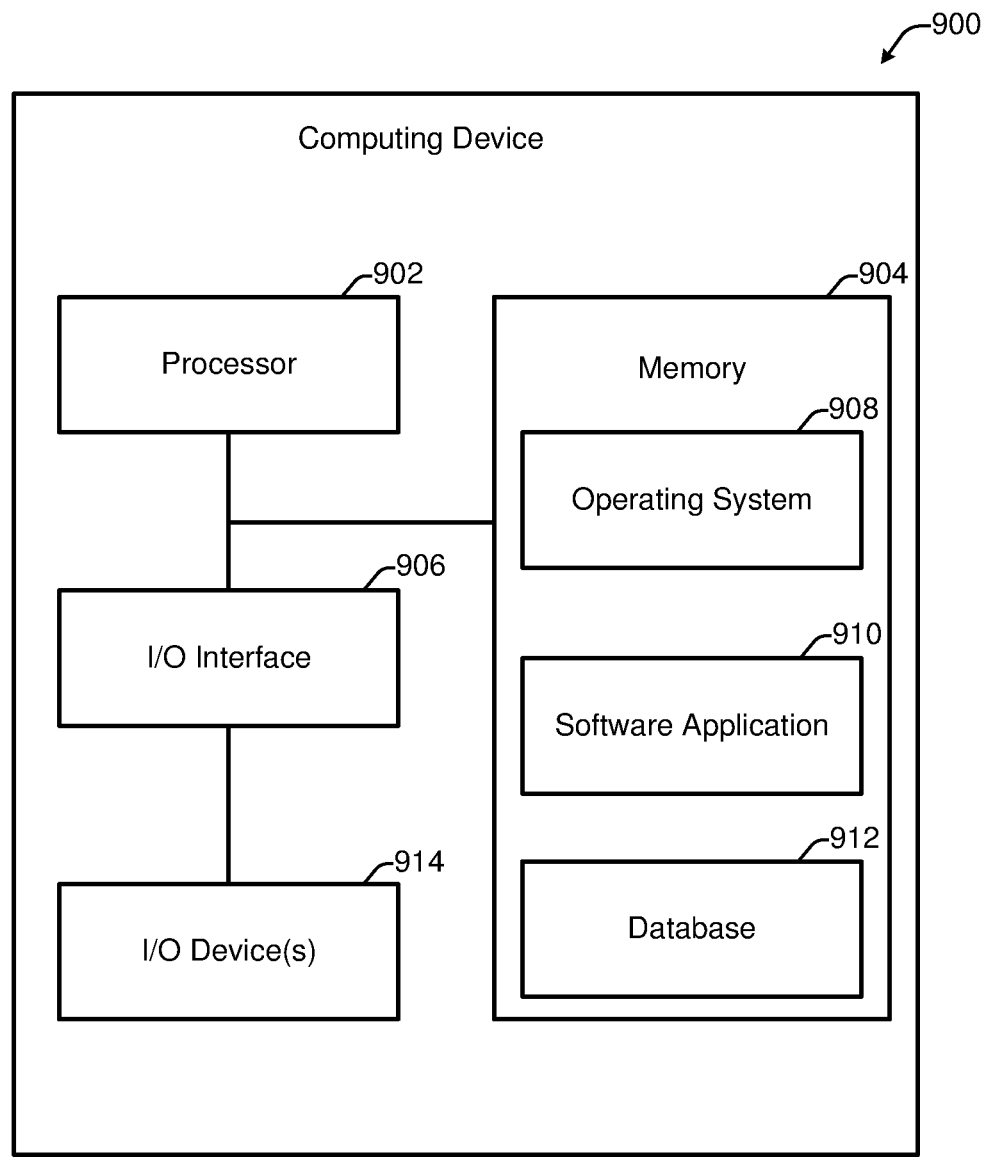
FIG. 9 is a block diagram illustrating an example computing device, in accordance with some implementations.

FIG. 9: Computing Devices

Hereinafter, a more detailed description of various computing devices that may be used to implement different devices and/or components illustrated in FIG. 1 is provided with reference to FIG. 9.

FIG. 9 is a block diagram of an example computing device 900 which may be used to implement one or more features described herein, in accordance with some implementations. In one example, device 900 may be used to implement a computer device, (e.g., 102, 110 of FIG. 1), and perform appropriate operations as described herein. Computing device 900 can be any suitable computer system, server, or other electronic or hardware device. For example, the computing device 900 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 900 includes a processor 902, a memory 904, input/output (I/O) interface 906, and audio/video input/output devices 914 (e.g., display screen, touchscreen, display goggles or glasses, audio speakers, headphones, microphone, etc.).

Processor 902 can be one or more processors and/or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, software application 910 and associated data 912. In some implementations, the applications 910 can include instructions that enable processor 902 to perform the functions described herein. Software application 910 may include some or all of the functionality required to model components and infer 3D skeletal structures for practical 3D assets. In some implementations, one or more portions of software application 910 may be implemented in dedicated hardware such as an application-specific integrated circuit (ASIC), a programmable logic device (PLD), a field-programmable gate array (FPGA), a machine learning processor, etc. In some implementations, one or more portions of software application 910 may be implemented in general purpose processors, such as a central processing unit (CPU) or a graphics processing unit (GPU). In various implementations, suitable combinations of dedicated and/or general purpose processing hardware may be used to implement software application 910.

For example, software application 910 stored in memory 904 can include instructions for retrieving user data, for displaying/presenting avatars having inferred skeletal structures, and/or other functionality or software such as the modeling component 130, VE Engine 104, and/or VE Application 112. Any of software in memory 904 can alternatively be stored on any other suitable storage location or computer-readable medium. In addition, memory 904 (and/or other connected storage device(s)) can store instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. For example, network communication devices, storage devices (e.g., memory and/or data store 106), and input/output devices can communicate via interface 906. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 9 shows one block for each of processor 902, memory 904, I/O interface 906, software blocks 908 and 910, and database 912. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While the online server 102 are described as performing operations as described in some implementations herein, any suitable component or combination of components of online server 102, or similar system, or any suitable processor or processors associated with such a system, may perform the operations described.

A user device can also implement and/or be used with features described herein. Example user devices can be computer devices including some similar components as the device 900, e.g., processor(s) 902, memory 904, and I/O interface 906. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 914, for example, can be connected to (or included in) the device 900 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 300 and/or 800) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

In situations in which certain implementations discussed herein may obtain or use user data (e.g., user demographics, user behavioral data, user contextual data, user settings for advertising, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
receiving an avatar data model for a three-dimensional (3D) avatar, the avatar data model comprising at least a first body part from a first parent model, and a second body part from a second parent model, wherein the first parent model is a first 3D model, and wherein the second parent model is a second 3D model;
creating a graph representation for the avatar data model, wherein the graph representation begins at a selected root point for the avatar data model and extends to terminal portions of the avatar data model, wherein the graph representation comprises a plurality of nodes labeled according to corresponding individual body parts of the avatar data model;
traversing the graph representation to determine a plurality of joint locations, wherein the joint locations each represent a respective location where a joint is to be placed, wherein the joint locations are determined based on intersections of different body parts, descriptions of different body parts, or connections between different body parts, and wherein at least one joint location of the joint locations represents an intersection between the first body part and the second body part;

inferring a skeletal structure between the plurality of joint locations such that, for all joints, a skeletal portion extends between a first joint and a second joint, the skeletal portion rotates by motion of one or both of the first joint and the second joint, and for the at least one joint location, at least one skeletal portion extends from the at least one joint location based on a scale of a corresponding skeletal portion of the second 3D model; and combining joints at each of the plurality of joint locations, the inferred skeletal structure, and the avatar data model to create a practical 3D asset.

2. The computer-implemented method of claim 1, further comprising:

animating the practical 3D asset in a virtual environment of a virtual experience.

3. The computer-implemented method of claim 2, wherein animating the practical 3D asset comprises utilizing the inferred skeletal structure for skin deformations during animation of the practical 3D asset.

4. The computer-implemented method of claim 1, further comprising creating a weight map for individually placed joints, wherein the weight map controls a degree of movement of each joint based upon the inferred skeletal structure.

5. The computer-implemented method of claim 1, wherein the graph representation further comprises a plurality of edges, wherein each edge of the plurality of edges extends between at least two nodes of the plurality of nodes, and wherein each edge of the plurality of edges represents a respective joint location, wherein each node that is linked to two or more edges has one or more virtual bones inferred between the two or more edges to manage positions of non-distal nodes of the plurality of nodes.

6. The computer-implemented method of claim 1, wherein each joint combined at the plurality of joint locations comprises either an animated joint or a fixed joint.

7. The computer-implemented method of claim 1, further comprising skinning the practical 3D asset based upon at least the inferred skeletal structure.

8. The computer-implemented method of claim 1, wherein traversing the graph representation comprises one or more of: a depth first search or a breadth first search.

9. The computer-implemented method of claim 1, wherein the graph representation comprises a weighted graph having weights assigned to edges based upon a scale of individual body parts of the avatar data model, wherein the scale informs inference of the inferred skeletal structure.

10. The computer-implemented method of claim 1, wherein one or more of the first parent model or the second parent model are user-generated content of a virtual experience platform.

11. A system, comprising:

a memory with instructions stored thereon; and a processing device, coupled to the memory and operable to access the memory, wherein the instructions when executed by the processing device, cause the processing device to perform operations including:

receiving an avatar data model for a three-dimensional (3D) avatar, the avatar data model comprising at least a first body part from a first parent model, and a second body part from a second parent model, wherein the first parent model is a first 3D model, and wherein the second parent model is a second 3D model;

creating a graph representation for the avatar data model, wherein the graph representation begins at a selected root point for the avatar data model and extends to terminal portions of the avatar data model, wherein the graph representation comprises a plurality of nodes labeled according to corresponding individual body parts of the avatar data model;

traversing the graph representation to determine a plurality of joint locations, wherein the joint locations each represent a respective location where a joint is to be placed, wherein the joint locations are determined based on intersections of different body parts, descriptions of different body parts, or connections between different body parts, and wherein at least one joint location of the joint locations represents an intersection between the first body part and the second body part;

inferring a skeletal structure between the plurality of joint locations such that, for all joints, a skeletal portion extends between a first joint and a second joint, the skeletal portion rotates by motion of one or both of the first joint and the second joint, and for the at least one joint location, at least one skeletal portion extends from the at least one joint location based on a scale of a corresponding skeletal portion of the second 3D model; and combining joints at each of the plurality of joint locations, the inferred skeletal structure, and the avatar data model to create a practical 3D asset.

12. The system of claim 11, wherein the operations further comprise animating the practical 3D asset in a virtual environment of a virtual experience.

13. The system of claim 12, wherein animating the practical 3D asset comprises utilizing the inferred skeletal structure for skin deformations during animation of the practical 3D asset.

14. The system of claim 11, wherein the graph representation further comprises a plurality of edges, wherein each edge of the plurality of edges extends between at least two nodes of the plurality of nodes, and wherein each edge of the plurality of edges represents a respective joint location, wherein each node that is linked to two or more edges has one or more virtual bones inferred between the two or more edges to manage positions of non-distal nodes of the plurality of nodes.

15. The system of claim 14, wherein the virtual bones are scaled based upon a customized version of the avatar data model and the corresponding individual body parts.

16. The system of claim 11, wherein each joint combined at the plurality of joint locations comprises either an animated joint or a fixed joint.

17. The system of claim 11, wherein the operations further comprise skinning the practical 3D asset based upon at least the inferred skeletal structure.

18. The system of claim 11, wherein traversing the graph representation comprises one or more of: a depth first search or a breadth first search.

19. The system of claim 11, wherein the graph representation comprises a weighted graph having weights assigned to edges based upon a scale of individual body parts of the avatar data model.

20. A non-transitory computer-readable medium with instructions stored thereon that, responsive to execution by a processing device, causes the processing device to perform operations comprising:

receiving an avatar data model for a three-dimensional (3D) avatar, the avatar data model comprising at least a first body part from a first parent model, and a second body part from a second parent model, wherein the first parent model is a first 3D model, and wherein the second parent model is a second 3D model;

creating a graph representation for the avatar data model, wherein the graph representation begins at a selected root point for the avatar data model and extends to terminal portions of the avatar data model, wherein the graph representation comprises a plurality of nodes labeled according to corresponding individual body parts of the avatar data model;

traversing the graph representation to determine a plurality of joint locations, wherein the joint locations each represent a respective location where a joint is to be placed, wherein the joint locations are determined based on intersections of different body parts, descriptions of different body parts, or connections between different body parts, and wherein at least one joint location of the joint locations represents an intersection between the first body part and the second body part;

inferring a skeletal structure between the plurality of joint locations such that,
  for all joints, a skeletal portion extends between a first joint and a second joint, the skeletal portion rotates by motion of one or both of the first joint and the second joint, and
  for the at least one joint location, at least one skeletal portion extends from the at least one joint location based on a scale of a corresponding skeletal portion of the second 3D model; and combining joints at each of the plurality of joint locations, the inferred skeletal structure, and the avatar data model to create a practical 3D asset.

\* \* \* \* \*